(12) United States Patent
Fehrenbacher

(10) Patent No.: US 7,465,937 B2
(45) Date of Patent: Dec. 16, 2008

(54) DOSIMETER FOR THE DETECTION OF HIGH-ENERGY NEUTRON RADIATION

(75) Inventor: Georg Fehrenbacher, Mühltal (DE)

(73) Assignee: Gesellschaft für Schwerionenforschung mbH, Darmstadt (DE)

(*) Notice: Subject to any disclaimer, the term of this patent is extended or adjusted under 35 U.S.C. 154(b) by 87 days.

(21) Appl. No.: 10/561,287

(22) PCT Filed: May 29, 2004

(86) PCT No.: PCT/EP2004/005845
§ 371 (c)(1),
(2), (4) Date: Dec. 20, 2005

(87) PCT Pub. No.: WO2005/001512
PCT Pub. Date: Jan. 6, 2005

(65) Prior Publication Data
US 2006/0138345 A1   Jun. 29, 2006

(30) Foreign Application Priority Data
Jun. 27, 2003 (DE) ............... 103 29 816
Aug. 1, 2003 (DE) ............... 103 35 225

(51) Int. Cl.
G01T 1/15 (2006.01)

(52) U.S. Cl. ............... 250/390.03; 250/390.01; 250/370.05; 250/472.1; 250/370.07

(58) Field of Classification Search ............... None
See application file for complete search history.

(56) References Cited

U.S. PATENT DOCUMENTS

| | | | |
|---|---|---|---|
| 3,699,337 A | 10/1972 | Hoy | |
| 4,383,179 A * | 5/1983 | Eisen et al. | 250/472.1 |
| 4,492,872 A * | 1/1985 | Burgkhart et al. | 250/484.3 |
| 4,758,168 A | 7/1988 | Awakowicz et al. | |
| 4,785,168 A | 11/1988 | Ruscev et al. | |
| 4,804,514 A | 2/1989 | Bartko et al. | |
| 5,081,362 A | 1/1992 | Vargo | |

(Continued)

FOREIGN PATENT DOCUMENTS

CH     508 887 A     6/1971

(Continued)

OTHER PUBLICATIONS

McGregor, D.S. et al., "Design consideration for thin film coated semiconductor thermal neutron detectors-I: basics regarding alpha particle emitting neutron reactive films", Nuclear Instruments & Methods in Physics Research A, pp. 272-308, Elseveir Science B.V., 2003.*

(Continued)

*Primary Examiner*—David P. Porta
*Assistant Examiner*—Yara B Green
(74) *Attorney, Agent, or Firm*—Harness, Dickey & Pierce, P.L.C.

(57) ABSTRACT

A dosimeter for detecting high-energy neutron radiation having a neutron converter and a detection element is proposed which is characterized by the neutron converter comprising metal atoms which convert the energy of the neutrons into protons, alpha particles and other charged nuclei in a suitable energy range so that they are detectable.

23 Claims, 4 Drawing Sheets

U.S. PATENT DOCUMENTS

| | | | | |
|---|---|---|---|---|
| 5,278,417 A | * | 1/1994 | Sun | 250/390.03 |
| 5,321,269 A | * | 6/1994 | Kitaguchi et al. | 250/370.05 |
| 5,406,086 A | * | 4/1995 | Barthe et al. | 250/390.03 |
| 5,572,027 A | * | 11/1996 | Tawil et al. | 250/336.1 |
| 5,656,815 A | * | 8/1997 | Justus et al. | 250/337 |
| 5,693,947 A | * | 12/1997 | Morton | 250/370.09 |
| 5,739,541 A | | 4/1998 | Kahilainen | |
| 6,566,657 B2 | * | 5/2003 | Odom et al. | 250/390.11 |
| 6,654,435 B1 | * | 11/2003 | Kronenberg et al. | 376/147 |

FOREIGN PATENT DOCUMENTS

| | | |
|---|---|---|
| CH | 508887 | 6/1971 |
| CH | 508 887 A | 7/1971 |
| DE | 28 29 960 C2 | 1/1979 |
| DE | 134 392 A | 2/1979 |
| DE | 134 392 A | 2/1979 |
| DE | 134392 | 2/1979 |
| DE | 32 01 243 A1 | 1/1983 |
| DE | 3201243 | 9/1983 |
| DE | 288 732 A7 | 4/1991 |
| DE | 694 17 770 T2 | 12/1999 |
| DE | 199 07 042 A1 | 9/2000 |
| DE | 100 42 076 A1 | 5/2001 |
| DE | 101 32 550 A1 | 1/2003 |
| JP | 63 154984 A | 6/1988 |
| JP | 09021881 | 1/1994 |
| JP | 63154984 | 6/1994 |
| JP | 2000-206261 A | 7/2000 |
| JP | 2000206261 | 7/2000 |

OTHER PUBLICATIONS

Luszik-Bhadra M., et al: "Development of personal neutron dosemeters at the PTB and first measurements in the space station MIR", Radiation Measurements, Elsevier Sciences Publishers, Banking, GB, Bd. 33, Nr. 3, Jun. 2001, pp. 305-312, XP004249148; ISSN: 1350-4487.

Delaney et al., "Radiation Detectors—Physical Principles and Applications," Clarendon Press, Oxford, 1992, pp. 62-65.

Jain et al., "Measurement of high energy neutrons by fission reactions," Radiation Measurements 34, 2001, pp. 129-132.

Olsher et al., "Wendi, An Improved Neuron Rem Meter," Health Physics, vol. 79, No. 2, Aug. 2000, pp. 170-181.

European Search Report dated Mar. 30, 2006; International Search Report dated Jun. 22, 2003.

* cited by examiner

DOSIMETER FOR THE DETECTION OF HIGH-ENERGY NEUTRON RADIATION

The application for the invention relates to a dosimeter for detecting high-energy neutron radiation in accordance with claim 1.

Accelerator facilities for research purposes and for use in the industrial and medical fields are operated world-wide. Particles are accelerated to extremely high energies in these facilities. For example, in modern heavy ion accelerators ions are accelerated to energies of about 1 GeV per nucleon. In other facilities, particles are accelerated to even higher energies into the teraelectron volt (TeV) range. These high-energy particles produce secondary radiation, charged particles and neutrons, when they interact with material. The energy spectrum of the neutrons produced ranges from 0.025 eV to several hundred gigaelectron volts (GeV), since the maximum energy of the neutrons generated has the same energy range as the primary particle beams. For protection against radiation, it is necessary to measure the neutrons generated in order to dimension radiation protection measures, in particular shields. Since high-energy neutrons have a long average path length in material, they can penetrate even very strong shields. So it is necessary and extremely important to measure and monitor constantly the neutron intensity and the energy and angular distribution of the neutrons, even outside the shields. Persons moving in the area of accelerator facilities (inside or outside the shields) must wear personal dosimeters permanently which measure and save the current neutron dose to which these persons are exposed. Particularly for radiation protection monitoring, it is important, in order to verify neutron radiation, to develop dosimeters which can be used in the entire energy range of neutron radiation, from the range of thermal neutrons (0.025 eV) up to the highest energies in the range of GeV or higher (up to 1 TeV).

Dosimeters for neutron radiation have been developed previously for areas of nuclear technology (nuclear reactors, radio-nucleid sources, fuel rod industry, transport of spent fuel rods) which permit dosage measurements for maximum energies of about 10 to 20 MeV.

The response capability of most types of dosimeter for neutrons of energy higher than 20 MeV is very low, the response capability decreasing with increasing neutron energy. One of the reasons for this effect is the decrease in the probability cross section, in the reactions used for verification with increasing neutron energy. In general, it holds true that with increasing neutron energy the particles generated in elastic and inelastic scattering become energy-richer. It holds true for the braking ability of charged, energy-rich particles that with increasing energy the braking ability and thus also the deposition of energy in the dosimeter layer decreases. Above a certain energy of the charged particles, this has the effect that they can no longer be verified. Neutron fields with quantities of higher-energy neutrons in the energy spectrum can then only be measured through special calibration factors in dosage estimation. However, the neutron fields in accelerators are highly varied in their energy distribution so that standardized calibration factors cannot always be given. Dosimetric systems which measure the entire energy range do not exist yet.

There are initiatives in the literature to improve the response capability of neutron dosimeters for high neutron energies by reducing neutron energy through the use of a moderator before the actual dosimeter. This approach cannot be used for extremely high neutron energies because the moderator body would be too bulky for use in a personal dosimeter.

The use of radioactive films of fissionable material together with nuclear track detectors is also described. They, too, cannot be used in any meaningful way as personal dosimeters since dosimeters with radioactive components cannot be used in personal dosimetry.

The object of the invention is to develop dosimeters for detecting high-energy neutron radiation which permit the measurement of high neutron energies up to extremely high energies of, for example, 1 TeV.

To achieve this object, a dosimeter having the features named in claim 1 is proposed. Since neutrons are electrically neutral particles, they cannot be verified directly by means of an ionization process, so they are converted into ionizing radiation. The high-energy neutrons are converted with the help of metal atoms into charged particles such as protons, alpha particles and other charged nuclei which can be verified directly in a dosimeter detecting element.

The dosimeter with the features named in claim 1 meets the following requirements:

1. An adequately large probability cross-section is provided for reactions of the incident neutrons with the metal atoms of the neutron converter so that the energy of the neutrons is converted into protons, alpha particles and other charged nuclei.
2. The probability cross-section of the dosimeter is energy-dependent. The suitable selection of metal atoms ensures that the cross-section is still adequately large, even at very high neutron energies.
3. The conversion of the energy from neutrons into the particles named previously ensures that they have sufficiently high energy to be detected by the detection element. At the same time, their energy is not so high that adequately high energy deposition in the detection element can take place.
4. In the conversion of neutron radiation energy, the following physical effects occur: spallation, fragmentation and fission. To detect the high-energy neutron radiation, the particles resulting from spallation and fragmentation are utilized.

The preferred embodiment of a dosimeter is one in which the neutron converter comprises several layers, each of which has metal atoms of a specific atomic number. This allows the best analysis of neutron radiations of different energy.

A further preferred embodiment is characterized has a neutron converter with a thin layer with $^6$Li atoms and/or $^{10}$B atoms and/or $^{14}$N atoms. For the layer comprising the $^{14}$N atoms, a polyamide such as, for example, nylon is preferred. The atoms are preferably arranged in a thin layer which, viewed from the side of the dosimeter facing the neutron radiation, lies in front of the detection element. The dosimeter with this type of structure is suitable for additionally detecting neutron radiation with a lower energy, for example, thermal neutrons.

A further embodiment is characterized by the provision of a hydrogenous polymer. The neutron converter is furnished with different layers, the first layer of which facing the neutron radiation contains metal atoms, the second layer below it the hydrogenous polymer and the third layer $^6$Li atoms and/or $^{10}$B atoms and/or $^{14}$N atoms. The third layer is positioned in the immediate vicinity of the detector element or arranged on same.

Additional embodiments become clear from the remaining dependent claims.

The invention is explained in greater detail with reference to the drawing.

Figure 1:
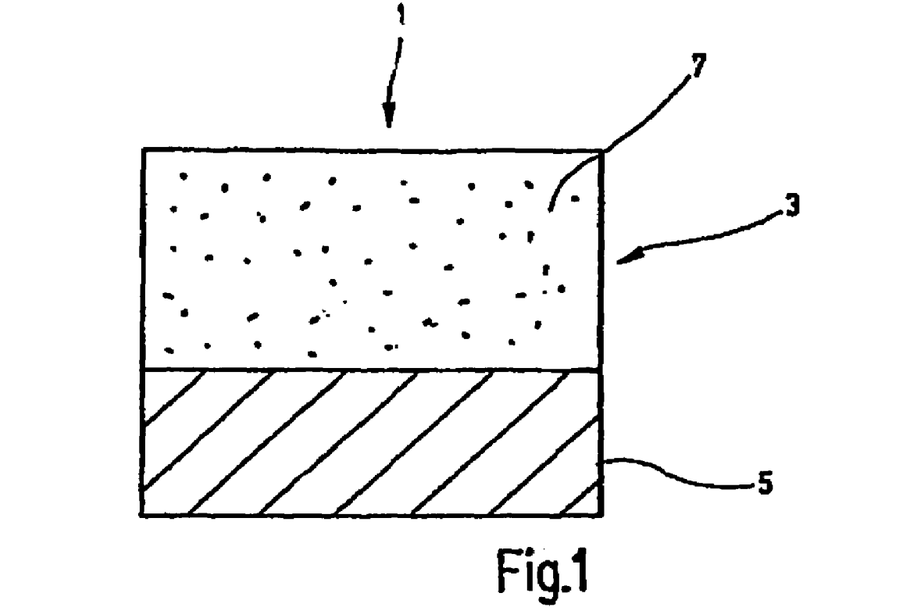
FIG. 1 shows a dosimeter with a neutron converter having metal atoms and a detection element.

The dosimeter shown in FIG. 1 is shown in cross-section. From this it can be seen that the dosimeter has a neutron converter 3 and detection element 5. In high-energy neutron radiation detection, the neutrons impinge on the neutron converter 3 from above in accordance with the drawing from FIG. 1. The neutron converter comprises metal atoms 7 on which the high-energy neutrons impinge. If the incident neutrons strike a metal atom with numerous nucleons, the result is spallation, meaning evaporation of protons and neutrons. An intranuclear cascade is created in the nucleus of the metal atom in which, besides protons, neutrons are emitted whose energy is less than that of the neutrons impinging on the dosimeter 1.

The neutrons impinging on the metal atoms 7 cause the nuclei of the metal atoms to break up, there is a fragmentation of the metal atom, also described as the target nucleus, into several nuclei and then vaporization of charged particles. Besides protons and alpha particles and other fragments, neutrons are generated. The energy of the resulting charged particles is less than that of the neutrons impinging on the dosimeter 1.

When the high-energy neutron radiation impinges on the neutron converter 3 of the dosimeter 1, spallation or fragmentation takes place. In addition, there is also fission of heavy nuclei in two nuclei, with the release of two to three neutrons. This, however, is primarily when metal atoms from radioactive substances are used. Naturally, great care is taken when using the dosimeter 1 as a personal dosimeter that no radioactive metal atoms are employed.

But, depending on the energy of the incident neutrons, the released neutrons have a varying probability cross-section. As a result, the dosimeter has a varying response function or a varying response capability. If neutrons with an energy of about 30 MeV strike the dosimeter, protons whose energy can be detected by the dosimeter 1 are created in the intranuclear cascade occurring during spallation. The energy is so low, however, that the dosimeter 1 does not respond.

With higher-energy neutron radiation impinging on the dosimeter 1, the following happens:

For their part, the protons generated by cascade processes have higher energy, corresponding to the higher energy of the impinging neutrons, which, as the energy of the neutrons increases, is ultimately so great that these protons can no longer be registered by the detection element. With the simultaneously existing fragmentation, protons are created in this instance whose energy is so great that they can be detected by the detection element 5.

So it turns out that detection by means of a detection element 5 is possible when detecting neutron radiation at low energy based on the evaporation of protons. With higher energy in the neutron radiation to be detected, detection in the detection element 5 cannot take place with respect to the protons generated by the intranuclear cascade. Here it is the protons created in the fragmentation process by evaporation which can be detected by the detection element 5 of the dosimeter 1. These two physical effects complement each other in the detection of high-energy neutron radiation, where the intranuclear cascade is the process contributing to detection up to energies of 30 MeV, and for energies above several 100 MeV the vaporization processes predominate in fragmentation In order to be able to detect neutron radiation of different energies, the atomic numbers of the metal atoms are selected such that protons generated as part of spallation and fragmentation can be detected reliably in the detection element 5. Spallation and fragmentation take place only in the presence of metal atoms with a sufficiently high atomic number. Neutrons impinging on the dosimeter 1 heat up the nuclei of the metal atoms and the kinetic energy of the impinging neutron is distributed over many neutrons. Not until the energy of the incident neutron is distributed over a sufficient number of nucleons does evaporation of neutrons, protons and alpha particles take place whose energy is such that they can be registered by the detection element 5.

In sum, the neutrons impinging on the metal atoms 7 generate a particle spectrum whose energy is less than the energy of the impinging neutrons. Since the atomic number Z of the metal atoms determines the energy distribution of the emitted particles, the number can be selected such that the particles can be detected by the detection element 5.

Selection of the atomic number Z of the metal atoms can ensure, even with different energy for the neutron radiation to be registered, that particles are generated with an energy spectrum which can be detected by the detection element 5. For example, an atomic number $Z>15$ can be selected for the metal atoms 7 present in the neutron converter 3. Preferably, metal atoms with an atomic number $Z>20$ are selected in order to generate particles, even with very high energy neutron radiation, which are detectable by the detection element 5.

For example, metal atoms from the iron group (Sc, Ti, V, Cr, Mn, Fe, Mn, Co, Cu) with an atomic number $Z \geqq 20$ and/or the group starting with the atomic number $Z=39$ (Y, Zr, Nb, Mo, Rh, Pd and Ag, In) and/or the group starting with the atomic number $Z \geqq 55$ (Sb, Cs, Ce, Ba, La) and/or the group starting with the atomic number $Z \geqq 63$ (Eu, Wd, Sm, Ga, Er) and/or the group starting with the atomic number $Z \geqq 74$ (Ta, W, R, Au, Pt) and/or with the atomic number $Z=80$ (Hg) and $Z=82$ (Bi) can be selected in the neutron converter 3.

Metal atoms of titanium, copper, iron, wolfram or lead are particularly preferred for the detection of high-energy neutron radiation. Small metal plates which can be rolled out are easily fabricated from these metals.

In order to be able to adjust the dosimeter 1 to detect neutron radiation of a specific energy, metal atoms from alloys are also used. Elconite is preferably used, which essentially consists of 35% Cu and 65% W. In addition, atoms from metal-bearing ceramics (yttrium-oxide, cer-oxide) can also be used. Overall, it must be remembered that the metal atoms 7 intended for use in the neutron converter 3 are selected according to which energy is expected in the neutron radiation. The atomic number of the metal atoms is matched accordingly to the energy spectrum of the neutron radiation to be detected.

The thickness of the neutron converter 3 and the number of metal atoms present in the neutron converter 3 must be selected such that on the one hand a sufficiently large number of protons is generated and on the other hand, in spite of their limited range, they reach the detection element 5 and leave behind a verifiable trace. Preferably a layer of lead about 2 mm thick is selected as the neutron converter 5.

FIG. 1 represents schematically that the neutron converter 3 comprises individual metal atoms 7. Preferably the neutron converter 3 is implemented by means of a metallic layer applied to the detection element 5, for example a metal foil which is preferably produced by a rolling process or through vapor deposition of a metal layer on the detection element 5.

Metal atoms can be used from metals in their purest form or from alloys. So it is possible to produce metal foils or a vapor deposition layer of metal atoms in their purest form or from an alloy.

Figure 2:
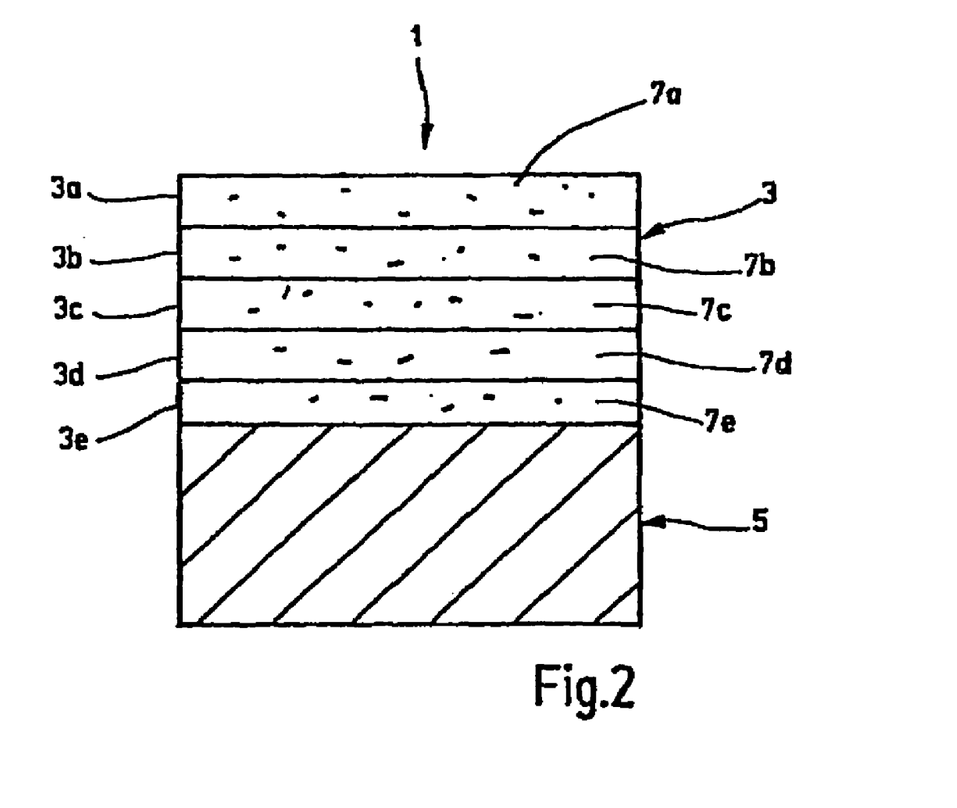
FIG. 2 shows a dosimeter with a neutron converter having a number of layers with metal atoms of different atomic numbers Z and a detection element.

FIG. 2 shows a modified embodiment of a dosimeter 1 in cross-section. Identical parts are given the same reference numbers so that reference is made to the description for FIG. 1 to avoid repetition.

The dosimeter 1 has a neutron converter 3 which has more than one layer, here for example, five layers 3a to 3e.

The neutron converter 3 comprises, as in the embodiment in accordance with FIG. 1, metal atoms 7 which are matched to the energy of the neutron radiation to be detected.

In the embodiment shown here, there are metal atoms 7a in the topmost layer 3a exposed to the neutron radiation. Metals atoms 7b are present in the layer below it 3b. In the same manner, there are metal atoms 7c, 7d and 7e present in layers 3c, 3d and 3e.

In this case also, the metal atoms in the individual layers can come from metals in their purest form or in the form of alloys.

An embodiment of the dosimeter 1 is particularly preferred in which metal atoms of different atomic numbers Z are found in each of the various layers 3a to 3e.

An embodiment of the dosimeter 1 is preferred in which there are metal atoms 7a to 7e present in the individual layers 3a to 3e from top to bottom whose atomic number Z is different for each layer. Metal atoms with the highest atomic number are to be found in the uppermost layer 3a and then, in stages approaching the detection element 5, in the bottom layer 3e metal atoms 7e with the lowest atomic number.

The atomic number of the metal atoms 7a to 7e and the interval between the specific metal atoms 7a to 7e, or the respective layers 3a to 3e, are selected depending on the energy spectrum of the neutron radiation to be detected.

In the embodiment of the dosimeter 1 shown in FIG. 2, it is possible to have the atomic number of the metal atoms 7a to 7e for each layer decrease continuously from top to bottom toward the detection element 5 or to permit a free choice of the atomic number within the layers. So a layer that is lower down can have metal atoms with a higher atomic number than in the adjacent layers.

The selection of the sequence of layers with metal atoms of different atomic numbers can thus be adapted to the energy spectrum of the incident neutron radiation to be measured in order to achieve the best response capability for the dosimeter.

The individual layers of the dosimeter 3a to 3e of the dosimeter from FIG. 2 can be produced by metal foils and/or by metal sputtering. So it is possible to produce dosimeter 1 with different layers which consist only of foils or which were produced only by metal sputtering. It is also conceivable to combine metal foils and metal sputtering and alternate them in an arbitrary sequence.

In addition, it can also be arranged for the individual layers 3a to 3e to be of different thicknesses in order to adjust the response capability of the dosimeter 1 to neutron radiations of different energies.

Figure 3:
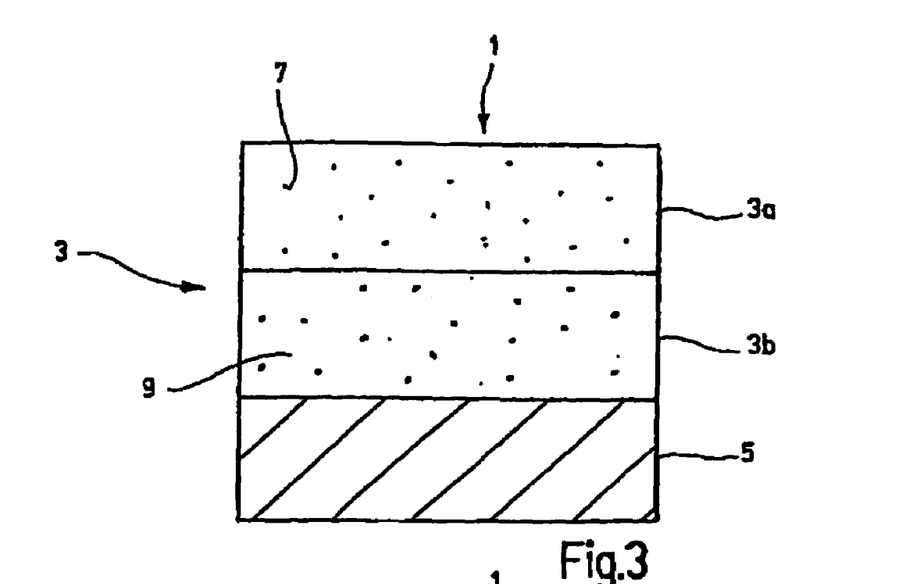
FIG. 3 shows a dosimeter with a neutron converter which has different layers serving to detect neutron radiation of different energies and in addition a detection element.

FIG. 3 shows an additional embodiment of a dosimeter 1 in cross-section. Identical parts are given the same reference numbers so that reference is made to the description of the preceding figures.

The dosimeter 1 has a neutron converter 3 which here comprises two layers 3a and 3b and in addition a detection element 5.

Once again, metal atoms 7 are to be found in the layer 3a facing the incident neutron radiation which, as in the embodiment in accordance with FIG. 2, may originate from metals in their purest form or from alloys. It is additionally possible to implement layer 3a as a metal foil or by metal sputtering.

There are $^6$Li atoms and/or $^{10}$B atoms and/or $^{14}$N atoms in layer 3b.

The following must be remembered concerning the function of dosimeter 1:

When neutron beams strike layer 3a with the metal atoms 7 facing the neutron radiation, spallation and fragmentation, as was explained using the embodiments in accordance with FIGS. 1 and 2, lead to the creation of protons, alpha particles and other nuclei which can be detected in the detection element 5 which can only register charged particles. In this regard, reference is made to the explanations for FIGS. 1 and 2.

When the high-energy neutrons collide with the metal atoms 7 in layer 3a, neutrons are also released whose energy is lower than that of the impinging neutrons. The neutrons in themselves are not perceptible to the detection element 5. In the embodiment shown in FIG. 3, they strike the $^6$Li atoms and/or $^{10}$B atoms 9, causing an (n, α) reaction, and/or the $^{14}$N atoms, causing an (n, p) reaction, the result of which is to convert the impinging neutrons from the metal atoms 7 into charged alpha particles or protons. They can be registered by the detection element 5.

By means of the $^6$Li atoms and/or $^{10}$B atoms and/or $^{14}$N atoms in layer 3b of the neutron converter 3, not only the neutrons originating from the metal atoms 7 can be detected, which increases the sensitivity of the dosimeter 1 compared with the embodiments from FIGS. 1 and 3, but predominantly neutrons impinging on the dosimeter 1 whose energy spectrum is very low-energy so that they can enter directly into an (n, α) reaction or an (n, p) reaction with the atoms 9.

The dosimeter shown in FIG. 3 is more sensitive with respect to the neutron radiation to be detected than the dosimeters shown in FIGS. 1 and 2. It is additionally capable of detecting neutron radiation with low energy below 30 MeV and the back-scattered neutrons.

Consequently, the energy spectrum that can be measured by the dosimeter in this embodiment is greater than that of the dosimeters shown in FIGS. 1 and 2.

In the case of the dosimeter shown in FIG. 3, the upper layer 3a of the neutron converter 3 taken by itself can have several layers, as was explained using the embodiment in FIG. 2.

Figure 4:
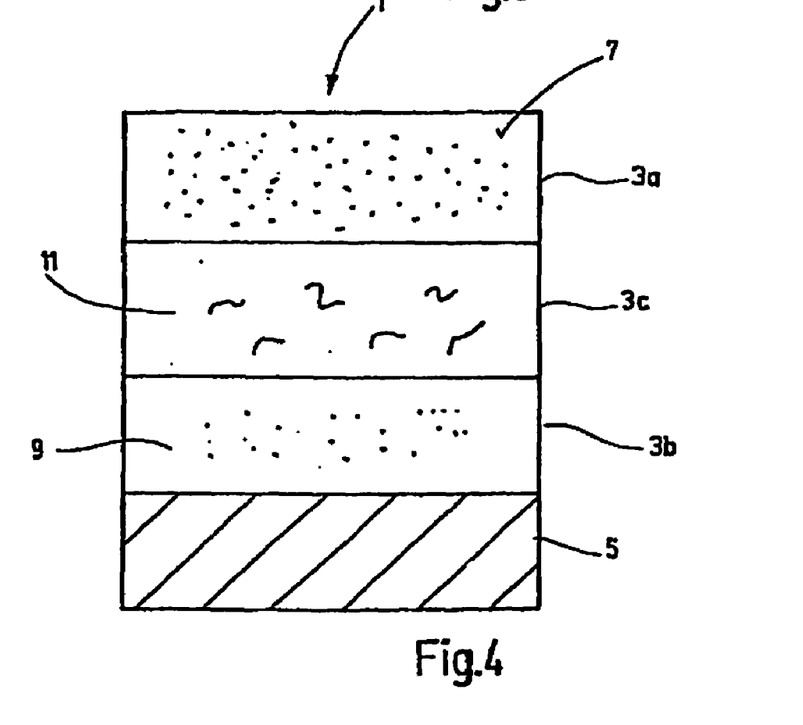
FIG. 4 shows a dosimeter with a neutron converter which has different layers for detecting neutron radiation of different energies and in addition a detection element.

FIG. 4 shows a modified embodiment of a dosimeter in cross-section which basically has the same structure as the one explained in FIG. 3. Identical parts have the same reference numbers so that reference is made to the description of the preceding figures. The neutron converter 3 here, however, has three layers, 3a, 3b and 3c, where the first layer 3a faces the incident neutron radiation and layer 3b lies on top of the detection element. Layer 3c lies between layers 3a and 3b.

The embodiment of the dosimeter shown in FIG. 4 differs in that a layer 3c is interposed between layers 3a and 3b of the neutron converter which comprises hydrogenous polymer, for example polyethylene (PE) or polymethylacrylate (PMMA).

The neutron converter 3 lies on top of a detection element 5, as was explained in detailed above.

Neutrons in the energy range between several 100 KeV and several 10 MeV can be verified in the layer that contains hydrogenous polymers. Elastic scattering of the high-energy neutrons with the protons from the hydrogenous polymer takes place. The protons are then verified in the detection element 5.

Neutrons penetrating layer 3c from above or from the side can be registered and detected in this layer by means of elastic scattering.

As in the case of the dosimeters explained with reference to the preceding figures, layer 3a of the dosimeter 1 shown in FIG. 4, but also layer 3b, can consist of several layers, as was explained with reference to the dosimeter shown in FIG. 2.

Figure 5:
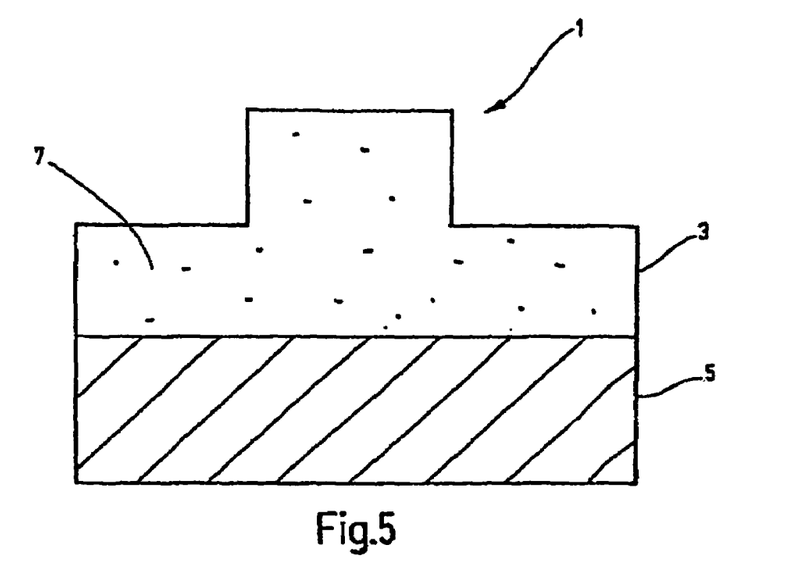
FIG. 5 shows a dosimeter with areas of different thickness and a detection element.

FIG. 5 shows a modified embodiment of a dosimeter 1 in cross-section, whose basic structure is essentially the same as the one shown in FIG. 1. Identical parts are given the same reference numbers so that in this respect reference is made to the preceding description.

The embodiment of the dosimeter 1 shown in FIG. 5 differs in that the neutron converter 3 does not have a constant thickness across the width of the dosimeter 1. As an example here, the thickness of the neutron converter 3 is greater in a center area than in the lateral areas adjoining said area.

The configuration of the thicker area can be freely chosen and can be adapted to different detection situations. For example, the thicker area can be essentially rectangular and extend across the width of the dosimeter 1. It is also conceivable to make provision for a quadrate or round projection on the upper side of the neutron converter 3, resulting in an area of greater thickness here.

The structure of the dosimeter 1 shown here provides greater sensitivity in the dosimeter with respect to neutron radiation impinging perpendicularly. This is because the number of metal atoms which can be struck by the neutron radiation is increased in the thicker area. The result is an extended path inside the neutron converter 3 for the neutrons in the area of greater thickness and thus an increased probability of their striking metal atoms 7.

When neutron beams pass through the thinner area of the neutron converter 3 at an angle, the path inside the neutron converter 3 increases compared with radiation entering perpendicularly. This also increases the probability that the neutron beam will strike metal atoms.

This construction makes it possible to implement a dosimeter 1 which reduces angular dependency in the detection of neutron beams.

Figure 6:
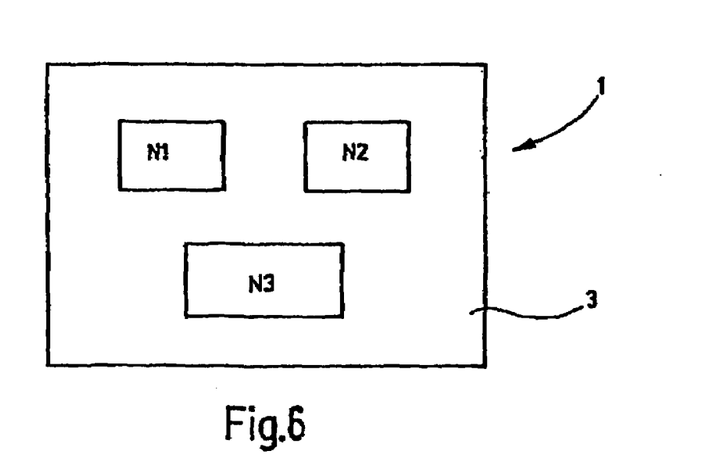
FIG. 6 shows a dosimeter with a neutron converter which has different fields and FIG. 7 shows a dosimeter with a number of detection elements for site dosage measurement.

FIG. 6 shows a plan view of a dosimeter 1, that is, a plan view of the neutron detector 3.

The basic assumption is that the neutron converter 3—when viewed in plan—has an identical structure across its entire extent. A plan view of the dosimeters shown in FIGS. 1 to 4 therefore does not show any features. With the dosimeter in accordance with FIG. 5, the only thing to see would be the area with the greater thickness.

In the case of the embodiment of the dosimeter 1 shown here, the intention is for the neutron converter to have different fields. As an example, three different areas N1, N2 and N3 are provided for the neutron converter 3 which are essentially rectangular in shape and disposed at a distance from each other. Naturally, it is also conceivable to configure the shape of the areas N1 to N3 differently, for example circular, ellipsoid or similar. It is also possible to have the areas adjoin each other directly and/or to select a different number of areas.

The areas N1, N2 and N3 differ in having a different structure. One possible arrangement is for the areas to be furnished with metal atoms of different atomic numbers Z, or have differently structured layers or similar.

As mentioned above, charged particles are generated in the different areas N1 to N3 which penetrate to the detection element 5 lying below the neutron converter and are detected there.

The different structure of the areas N1 to N3 causes the charged particles generated to have different properties with respect to distribution of energy and angle and consequently different detection characteristics in the detection element 5 with respect to the three areas N1 to N3.

The energy spectrum and the angular distribution of the neutron radiation impinging on the dosimeter 1 can be determined from the different detection results in the detection element 5. The properties of the various fields N1 to N3 can be varied and matched to neutron radiations with different energy spectra.

The basic assumption is that the detection element 5 in all the dosimeters described with reference to FIGS. 1 to 6 is of identical construction. Essentially, a distinction can be made between two types: active and passive detection elements.

A particularly simple dosimeter structure results when a passive detection element, here for example, an inorganic crystal such as a thermoluminescent crystal and/or an organic crystal and/or a high-molecular polymer, such as polycarbonate, and/or an inorganic glass is selected.

In passive detection elements, the charged particles cause radiation damage through the deposition of energy which, depending on the material used to implement the detection element, may be different in nature and can also be rendered visible in different ways. The detection element 5 is usually removed from the dosimeter 1 for analysis.

Through the energy deposited by the charged particles in the solid state lattice, the charged particles cause, for example in inorganic crystals like thermoluminescent crystals, for example Lif-Mg, Ti or $CaF_2$—Mn, $Li_2B_4O_7$—Mn, $Mg_2SiO_4$—Tb $CaSo_4$—Dy, BeO-Ma, $AL_2O_3$ freed electrons or holes which are captured by specific imperfections and create traps. They are freed again while giving off energy by selective heating of the detection element 5 in the form of heat and light. The light can be measured in a photometer. The intensity of the light is visible as a function of temperature in a spectrum of the glow curve. The area under the curve is a measure of the number of traps generated and thus of the number of charged particles registered by the detection element 5. The number of charged particles is dependent on the number of high-energy neutrons impinging on the dosimeter 1.

Since different charged particles have different ionization densities and give off amounts of energy of different size to the detection element 5, a different temperature is required to excite the traps generated. This means that at different temperature values, maximum intensities can be seen in the glow curve which can be assigned to the different types of radiation. By assigning the maximum intensities, it is possible to make a statement about the particle spectrum and thereby about the type of charged particles.

Thermoluminescent detectors can be used very successfully in areas in which there is not only neutron radiation but also photon radiation.

The detection element 5 can also contain an organic polymer such as polycarbonate, preferably allyl diglycol carbonate (CR-39) or macrofol. With detection elements 5 configured in this manner, the energy transferred by the charged particles into the detection element 5 is stored in latent nuclear tracks. They can be rendered visible in etch pits by means of a chemical or electrochemical etching process and analyzed optically. The density of the nuclear tracks inside the detection element 5 is proportional to the intensity of the charged particles registered, and thus also to the intensity of the irradiated neutrons.

It is also possible to implement the detection element 5 with the help of inorganic glass in which nuclear tracks are similarly created by impinging charged particles. The glass is similarly analyzed by means of the process described in connection with detection elements 5 of polycarbonate.

In practice, the detection elements equipped with passive detection units 5 are exposed to radiation for a specified, determined period and then exchanged and analyzed.

Detection elements 5 with passive elements can have fields which are constructed differently. Thus, the result can be a structure such as the one explained with reference to FIG. 6 regarding the neutron converter 3. With detection elements 5 that have such fields it is possible to analyze the energy and type of radiation impinging on the dosimeter 1. In this way it is possible to detect not only neutron radiation with a dosimeter 1 thus configured, but also mixed beam fields which, besides neutrons, have for example photons, including gamma radiation.

Dosimeter 1 of the type addressed here can also be equipped with detection elements which have at least one active element. They differ in that the impinging radiation dose can be called up at any time. This means that the current neutron dose can be displayed at any time.

When implementing active elements, MOS penetration detectors, whose operating principle is based on registering electrical penetration through an $SiO_2$ layer of a MOS capacitor, are preferably used in this connection. These penetrations are caused by the passage of a charged particle through the $SiO_2$ layer when there is an applied electrical field.

The count rate of such an MOS penetration detector is proportional to the flux density, that is the particles relative to a specific area, at a specific operating voltage.

Differently equipped fields can also be provided for a detection element 5 with an active element in order to analyze desired radiation fields.

Figure 7:
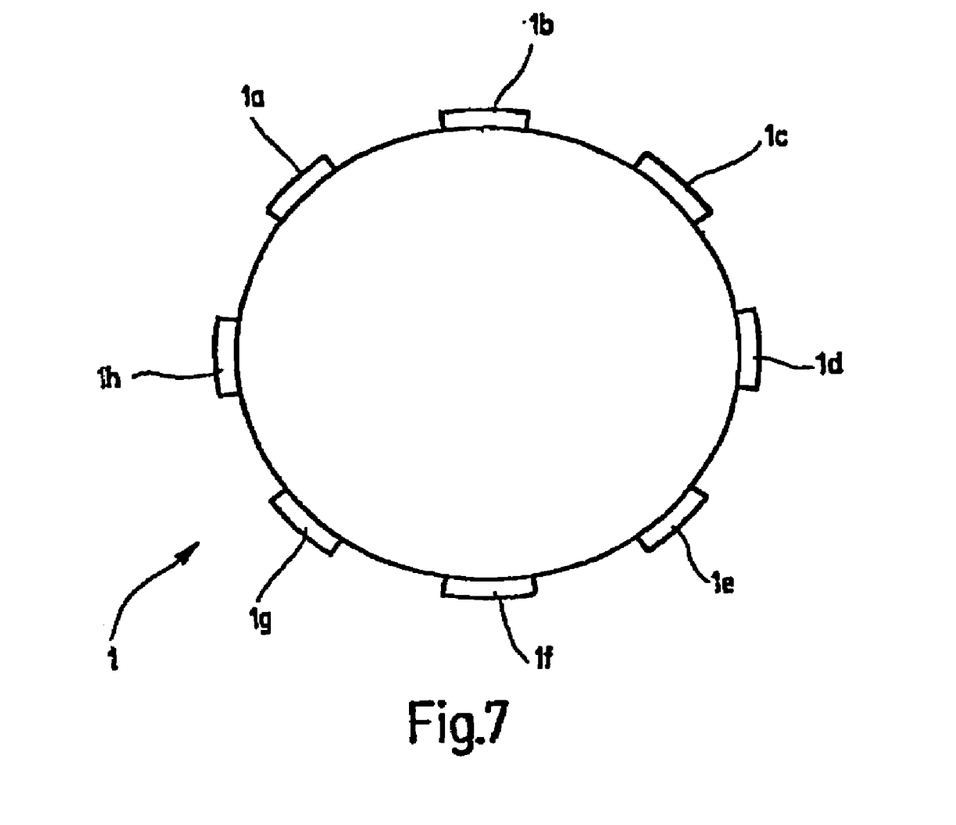

FIG. 7 shows a dosimeter 1 which has a number of dosimeter elements 1a to 1h. The individual dosimeter elements are here, for example, arranged in a circle and are configured as was explained with reference to the preceding figures. If necessary, dosimeter elements with different structures can be combined with each other into one dosimeter.

It is essential that the dosimeter elements are arranged symmetrically to each other. Preferably they are arranged not just in one plane, as shown in FIG. 7, but on a symmetrical body in space, preferably on a cone so that a local dosage measurement and a directional distribution measurement can be carried out by normalizing the individual dosimeter elements to each other and thus differently detected dosage readings are measured at different locations on the cone.

Normalization is performed by taking the measurements of one dosimeter element as a normal or reference variable. The measurements from the other dosimeter elements are divided by this normalizing variable. Thus the result is a normalized reading for each dosimeter element. The normalized readings make it easier to compare the dosages registered at different locations on the cone.

It is additionally possible to position several dosimeter elements 1a to 1h of a dosimeter on a phantom, that is to say, a model patterned after the human body in order to take a directional measurement.

Dosimeters of the type addressed here are housed in a casing when they are used as personal dosimeters. Such a casing typically has a planar front wall and a planar rear wall of the same size. Front and rear walls are spaced apart from each other by side walls which constitute the thickness of the casing. Typical dimensions for a casing are 30 mm×60 mm for front wall and rear wall. The thickness is 3 to 15 mm. The casing is made of plastic. If the personal dosimeter is to be used in a neutron radiation field in which a higher neutron flux or a high number of thermal neutrons can be expected, then the casing must be of special construction: the front and the rear wall and the side walls are made from different materials. The preferred arrangement is that only the side walls consist of polyethylene and contain borium ($^{10}B$) and/or cadmium (Cd) and/or nitrogen ($^{14}N$) and/or lithium atoms ($^{6}Li$) in the form of chemical compounds, such as borcarbide ($B_4C$). Since the elements named shield slow neutrons which pass through the side walls into the interior of the casing and thus on to the dosimeter, the personal dosimeter with this type of casing structure has a reduced response to slow neutrons. The excessive registration of slow neutrons determined by the geometry of the dosimeter elements when the dosimeter is installed in a casing with the front wall, rear wall and side walls of the same material, is compensated by the use of the casing described above for the dosimeter in accordance with the invention. Additionally, the directional dependence compared with a personal dosimeter which uses a known casing of the same material for the front, rear and side walls is modified.

Additional variants in the structure of the casing can be realized in further embodiments into which the dosimeter in accordance with claim 1 and the following dependent claims is installed.

It is additionally possible to provide at least two dosimeters with different metal atoms in one casing to meter the energy and/or angular distribution of a neutron field.

Dosimeters of the type addressed here can thus be employed universally. The number of dosimeter elements can be matched to the particular instance of detection.

What is claimed is:

1. A dosimeter comprising:
  (a) a neutron converter comprising
    metal atoms which convert high-energy neutrons to be detected into protons, alpha particles and charged particles in a suitable energy range so that they are detectable, wherein said metal atoms of the neutron converter are stable in the sense of radioactivity;
    a hydrogenous material which converts fast neutrons to be detected into protons;
    a material suitable to cause a (n, α) reaction and/or a (n, p) reaction to convert low-energy neutrons to be detected into protons and/or alpha particles; and
  (b) a detection element for detecting and registering said protons, alpha particles and charged particles as produced by said three converting processes;
    wherein the dosimeter is operative for detecting high-energy, fast and low-energy neutrons.

2. Dosimeter from claim 1, wherein the metal atoms of the neutron converter (3) have an atomic number of Z>15.

3. Dosimeter from claim 1, wherein the neutron converter comprises titanium, chrome, vanadium, iron, copper, wolfram and/or lead atoms.

4. Dosimeter from claim 1, wherein the neutron converter contains metal atoms with different atomic numbers.

5. Dosimeter from claim 1, wherein the neutron converter comprises metal atoms of alloys.

6. Dosimeter from claim 1, wherein the neutron converter comprises at least two layers with metal atoms of different atomic numbers.

7. Dosimeter from claim 1, wherein the neutron converter comprises layers with metal atoms where essentially only metal atoms with a specific atomic number are included in each layer.

8. Dosimeter from claim 7, wherein the layers of the neutron converter, viewed from the side of the dosimeter, facing the neutron radiation, contain metal atoms with descending atomic numbers.

9. Dosimeter from claim 7, wherein at least one of the layers with metal atoms is configured as metal foil, preferably as rolled metal foil, or polymer foil sputtered with metal.

10. Dosimeter from claim 7, wherein a sequence of the layers with metal atoms of different atomic numbers is matched to the energy spectrum of the neutron radiation.

11. Dosimeter from claim 1, wherein the neutron converter, viewed from the side of the dosimeter facing the neutron radiation, has $^6$Li atoms and/or $^{10}$B atoms and/or $^{14}$N atoms in front of the detection element—preferably arranged in a thin layer.

12. Dosimeter from claim 1, wherein at least two dosimeter elements with different metal atoms for measuring the energy and/or angular distribution can be housed in a casing.

13. Dosimeter from claim 11, wherein the neutron converter has a hydrogenous polymer between the metal atoms and the $^6$Li atoms and/or $^{10}$B atoms and/or $^{14}$N atoms.

14. Dosimeter from claim 1, wherein the neutron converter comprises layers where the first layer facing the neutron radiation contains metal atoms, the second layer the hydrogenous polymer and the third layer $^6$Li and/or $^{10}$B and/or $^{14}$N atoms.

15. Dosimeter from claim 1, wherein the neutron converter has fields (N1, N2, N3) with different structures arranged spatially next to each other.

16. Dosimeter from claim 1, wherein a number of dosimeter elements can be arranged symmetrically on the surface of a cone in order to carry out an area monitoring and a directional distribution measurement.

17. Dosimeter from claim 1, wherein a number of dosimeter elements can be arranged on a phantom in order to carry out a directional measurement.

18. Dosimeter from claim 1, wherein the detection element comprises at least one passive element and/or at least one active element.

19. Dosimeter from claim 1, wherein the passive element comprises organic high-molecular polymer, preferably polycarbonate or cellulose nitrate (preferably C39 or macroful), and/or an inorganic crystal and/or mineral, preferably a thermoluminescent crystal, in particular LiF, and/or inorganic glasses and/or an inorganic crystal.

20. Dosimeter from claim 1, wherein the active element has a semi-conductor, preferably silicon.

21. Dosimeter from one of the preceding claims, wherein provision is made for a photon dosimeter.

22. Dosimeter from olaim4 claim 7, wherein the converter layers and the detection element can be housed in a casing which has a front and back wall and side walls.

23. Dosimeter from claim 1, wherein the side walls contain borium, and/or cadmium and/or nitrogen ($^{14}$N) and/or lithium atoms ($^6$Li).

\* \* \* \* \*